June 14, 1949.　　　S. A. MONSON　　　2,473,212
AIRCRAFT SPRAYER
Filed May 13, 1947
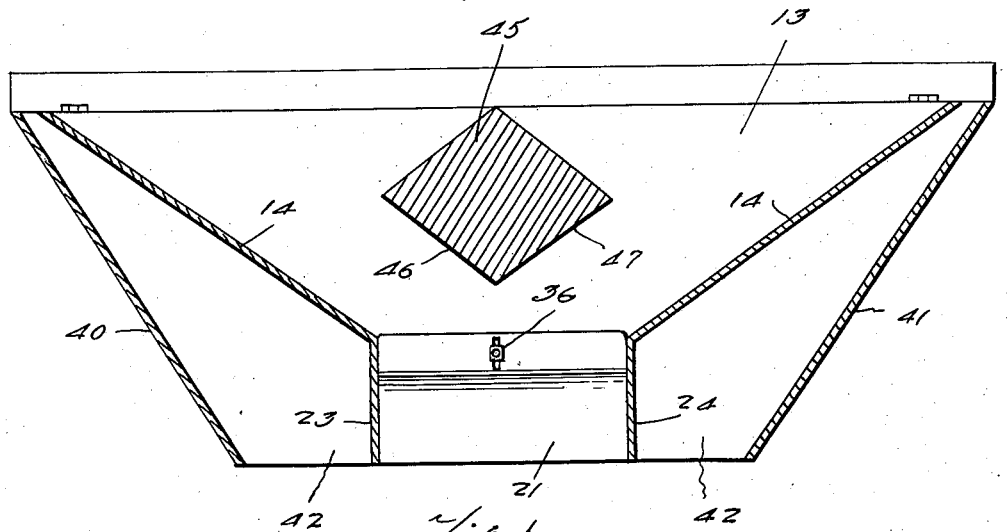
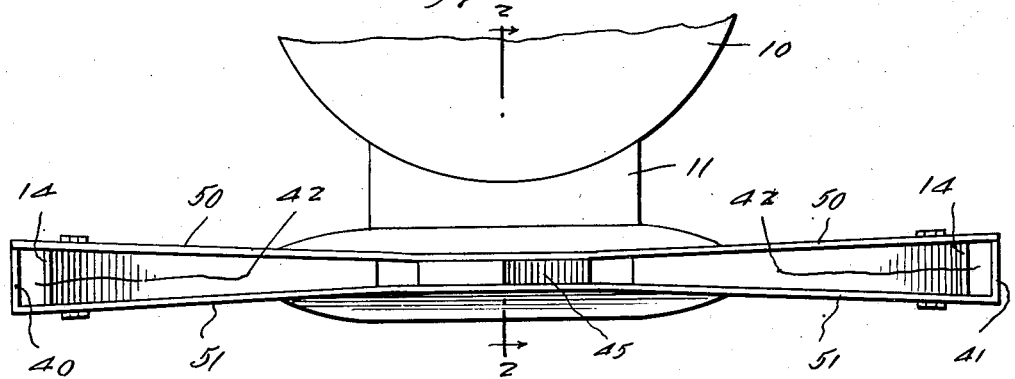
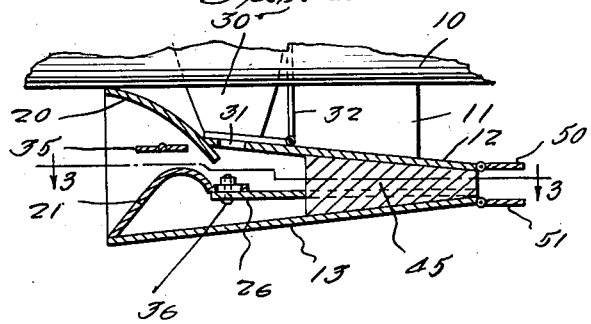
INVENTOR.
Sidney A. Monson
BY
McMorrow, Berman & Davidson
ATTORNEYS Patented June 14, 1949

2,473,212

UNITED STATES PATENT OFFICE 2,473,212

AIRCRAFT SPRAYER

Sidney A. Monson, Belleglade, Fla., assignor to Monson Manufacturing Co., Inc., Lakeland, Fla., a corporation of Florida Application May 13, 1947, Serial No. 747,815

2 Claims. (Cl. 244—136)

This invention relates to aircraft sprayers, and more particularly to the type that is attachable to airplanes for the purpose of spraying plant seeds, liquid, dust, insecticides, warfare chemicals, and other comminuted materials.

A principal object of the invention is to provide a sprayer of the type described that thoroughly and efficiently mixes air with the spraying material.

Another object of the invention is to provide a sprayer of the type described that is controllable to vary the concentration and direction of the spray.

Other objects will be apparent to those skilled in the art from a reading of the following specification.

The accompanying drawings illustrate a preferred embodiment of the invention, but it is understood that modifications may be made therein without departing from the spirit of the invention as hereinafter claimed.

Figure 1 represents a rear elevation of the new and improved spraying apparatus as attached to the fuselage of an airplane.

Figure 2 is a longitudinal vertical section of the spraying apparatus, taken along the lines 2—2 of Figure 1.

Figure 3 is a horizontal section of the spraying apparatus, taken along the line 3—3 of Figure 2.

With particular reference to the drawings, it will be observed that the spraying apparatus forming the subject matter of this invention is attached to the underside of the fuselage 10 of an airplane by means of a vertical support 11. The central portion of the spraying device comprises an upper member 12 and a lower member 13, converging toward the rear, as shown most clearly in Figure 2.

The central portion of the device further comprises two vertical side walls 14 that diverge from front to rear, as shown more particularly in Figure 3.

The anterior end of the device comprises a downwardly depending baffle 20, an upwardly extending throat 21, and two vertical walls 23 and 24. The throat 21 is attached to a floor member 26 that extends laterally to the side walls 14, and rearwardly to the outlet. Consequently, the baffle 20, the throat 21, and the two side walls 23 and 24 constitute a chamber for guiding the air that is to be mixed with the spray. Similarly, the upper member 12, the floor member 26, and the two vertical side walls 14 constitute a chamber where the air and the spray are mixed. The bottom member 13 constitutes a support for the throat 21 and the floor member 26, and may be omitted if the throat 21 and the floor member 26 are otherwise supported.

The vertical support 11 is tubular, and the interior thereof contains a hopper 30 for the liquid or comminuted material. The hopper 30 is positioned immediately above the upper member 12, and an opening 31 in the latter permits the material to fall into the mixing chamber. A vertical rod 32, under the control of the pilot of the aircraft, provides adjustment of the size of the opening 31.

A butterfly valve 35, mounted on a horizontal pivot, and likewise under the control of a member of the crew, provides regulation of the amount of air entering the mixing chamber.

The throat 21 is adjustably secured to the floor member 26 by means of a bolt 36. This adjustment is in an anterior posterior direction, and controls not only the amount of air entering the mixing chamber, but also the degree of turbulence in the mixing chamber and consequently the degree of mixing.

Two exterior side walls 40 and 41, converging rearwardly as indicated in Figure 3, constitute, in conjunction with the walls 14, two air nozzles 42, for a purpose to be described more fully hereinafter.

It will be observed that the baffle 20 extends downwardly below the opening 31 in the upper member 12, for the purpose of directing the air stream to the bottom of the mixing chamber to combine more thoroughly with the comminuted material falling through the opening 31.

To aid in more thorough mixing of the air and the comminuted material and in more even distribution thereof, the invention contemplates the use of a deflector 45 in the rear portion of the mixing chamber, the deflector 45 having front walls 46 and 47 that are substantially parallel with the walls 14.

The rear end of the mixing chamber is provided with an upper flap 50 and a lower flap 51, both of these flaps being mounted on horizontal hinges and being likewise under the control of a member of the crew.

In the operation of the device, the comminuted material in the hopper 30 is fed by gravity into the front portion of the mixing chamber. The amount of air is controlled by means of the butterfly valve 35. The air and the comminuted material are thoroughly mixed in the front portion of the mixing chamber and are thereafter diverted to both sides of the deflector 45. In this fashion, the spray is not only mixed thoroughly, but is also spread out laterally to cover a very wide area. The air nozzles 42 between the walls 40 and 14 and the walls 41 and 14 will impinge on the spray leaving the mixing chamber to direct the latter in an even and uniform distribution. The flaps 50 and 51 will of course control the vertical distribution of the spray.

The position of the throat 21 with respect to the floor member 26 may be adjusted in accordance with the nature and consistency of the comminuated material to be sprayed.

It has been observed that the device is extremely efficacious when positioned behind the propeller of an airplane so as to obtain the benefits of its backwash.

More even distribution is obtained when the upper member 12 and the floor member 26 are flared laterally, as indicated in Figure 2 of the drawings. When this is done, the flaps 50 and 51 will be flared accordingly.

It will be noted that the greatest constriction in the mixing chamber is in the immediate vicinity of the lowermost portion of the baffle 20. This constriction will in effect form a venturi, whereby the greatest velocity and lowest pressure exists at the point of the constriction. The constriction being near the opening 31, the particular conformation of the anterior portion of the mixing chamber will aid in withdrawing the comminuted material from the hopper 30 through the opening 31.

What is claimed is:

1. A spraying apparatus, comprising an air inlet chamber, a mixing chamber arranged rearwardly of said air inlet chamber and in communication therewith, said mixing chamber comprising a forward portion, a relatively wide rearward portion, and an intermediate portion, a supply chamber containing insecticide material communicating with the forward portion of said mixing chamber, said inlet chamber having an upwardly extending throat and a downwardly extending baffle to form a venturi, whereby the material in said supply tank is sucked into said mixing chamber, means in the forward portion of said mixing chamber for controlling the turbulence of the air therein, means in said intermediate portion for evenly diverting the material discharging from said mixing chamber in a horizontal direction, means adjacent the rearward portion of said mixing chamber for controlling the discharge of said material in a vertical direction, and a pair of air jets disposed at opposite sides of said rearward portion for laterally impinging said material being discharged from said rearward portion into the atmosphere to effect an even distribution thereof.

2. A spraying apparatus, comprising an air inlet chamber, a mixing chamber arranged rearwardly of said air inlet chamber and in communication therewith, said mixing chamber comprising a forward portion, a relatively wide rearward portion, and an intermediate portion, a supply chamber containing insecticide material communicating with the forward portion of said mixing chamber, said inlet chamber having an upwardly extending throat and a downwardly extending baffle to form a venturi, whereby the material in said supply tank is sucked into said mixing chamber, means in the forward portion of said mixing chamber for controlling the turbulence of the air therein, means in said inlet chamber for controlling the volume of air entering therein, means in said intermediate portion for evenly diverting the material discharging from said mixing chamber in a horizontal direction, means adjacent the rearward portion of said mixing chamber for controlling the discharge of said material in a vertical direction, and a pair of air jets disposed at opposite sides of said rearward portion for laterally impinging said material being discharged from said rearward portion into the atmosphere to effect an even distribution thereof.

SIDNEY A. MONSON.

REFERENCES CITED

The following references are of record in the file of this patent:

UNITED STATES PATENTS

| Number | Name | Date |
|---|---|---|
| 1,300,160 | Glover | Apr. 8, 1919 |
| 1,580,301 | Johnson | Apr. 13, 1926 |
| 1,691,205 | Morse | Nov. 13, 1928 |
| 1,703,308 | Johnson | Feb. 26, 1929 |
| 1,892,132 | Berney | Dec. 27, 1932 |
| 2,427,987 | Wilson | Sept. 23, 1947 |